(12) United States Patent
Chefalas et al.

(10) Patent No.: US 10,778,797 B2
(45) Date of Patent: Sep. 15, 2020

(54) ORCHESTRATION ENGINE FACILITATING MANAGEMENT OF OPERATION OF RESOURCE COMPONENTS

(71) Applicant: International Business Machines Corporation, Armonk, NY (US)

(72) Inventors: Thomas E. Chefalas, Somers, NY (US); Neeraj Asthana, Acton, MA (US); Alexei Karve, Mohegan Lake, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 15/946,348

(22) Filed: Apr. 5, 2018

(65) Prior Publication Data
US 2019/0312946 A1    Oct. 10, 2019

(51) Int. Cl.
*H04L 29/08*      (2006.01)

(52) U.S. Cl.
CPC .......... *H04L 67/2804* (2013.01); *H04L 67/10* (2013.01)

(58) Field of Classification Search
CPC ..... H04L 67/10; H04L 67/2804; H04L 63/00; G06F 9/46; G06F 9/5077; G06F 9/45533; G06F 21/577
See application file for complete search history.

(56) References Cited

U.S. PATENT DOCUMENTS

| 8,448,170 | B2 | 5/2013 | Wipfel et al. |
| 8,627,442 | B2* | 1/2014 | Ji .......................... H04L 63/0245 726/11 |
| 9,237,130 | B2* | 1/2016 | Ji .......................... H04L 63/0245 |

(Continued)

FOREIGN PATENT DOCUMENTS

WO      2014088537 A1    6/2017

OTHER PUBLICATIONS

Liu et al., Cloud Resource Orchestration: A Data-Centric Approach, 2011, 7 Pages.

(Continued)

*Primary Examiner* — Kostas J Katsikis
(74) *Attorney, Agent, or Firm* — Amin, Turocy & Watson, LLP

(57) ABSTRACT

Systems, computer-implemented methods, and computer program products that facilitate orchestration engine components for a cloud computing environment are provided. According to an embodiment, a system can comprise a memory that stores computer executable components and a processor that executes the computer executable components stored in the memory. The computer executable components can comprise a blueprint component that can, based on one or more dependencies between respective resource components of a cloud-based computing platform, declare a steady state action to be executed in response to a steady state event indicative of an event associated with steady state operation of a resource component of the cloud-based computing platform. The computer executable components can further comprise an orchestration engine component that can, based on the blueprint component, execute the steady state action in response to the steady state event.

23 Claims, 10 Drawing Sheets

(56) References Cited

U.S. PATENT DOCUMENTS

| | | |
|---|---|---|
| 9,432,350 B2 | 8/2016 | Anderson et al. |
| 9,621,435 B2 | 4/2017 | Vasudevan et al. |
| 9,645,858 B2 | 5/2017 | Winterfeldt et al. |
| 9,992,166 B2* | 6/2018 | Ji .................. H04L 63/0245 |
| 10,129,078 B2* | 11/2018 | Kumar ..................... G06F 8/70 |
| 10,257,219 B1* | 4/2019 | Geil ................. G06F 16/24578 |
| 10,382,353 B1* | 8/2019 | Krishnan ............ G06F 3/04847 |
| 2007/0067845 A1* | 3/2007 | Wiemer ............. H04L 63/1433 |
| | | 726/25 |
| 2008/0195407 A1* | 8/2008 | Hurley .................. G06F 21/577 |
| | | 705/1.1 |
| 2012/0233315 A1* | 9/2012 | Hoffman .............. G06F 9/5072 |
| | | 709/224 |
| 2012/0304275 A1* | 11/2012 | Ji ............................ H04L 63/02 |
| | | 726/11 |
| 2013/0019314 A1* | 1/2013 | Ji ............................ H04L 67/02 |
| | | 726/25 |
| 2013/0232480 A1 | 9/2013 | Winterfeldt et al. |
| 2013/0232498 A1 | 9/2013 | Mangtani et al. |
| 2014/0075032 A1 | 3/2014 | Vasudevan et al. |
| 2014/0196141 A1* | 7/2014 | Ji ........................ H04L 63/1416 |
| | | 726/14 |
| 2014/0324647 A1 | 10/2014 | Iyoob et al. |
| 2015/0101056 A1* | 4/2015 | Eberlein ............... G06F 21/577 |
| | | 726/25 |
| 2015/0161681 A1* | 6/2015 | Maes ...................... G06F 9/546 |
| | | 705/14.72 |
| 2016/0087939 A1* | 3/2016 | Ji ............................ H04L 67/02 |
| | | 726/11 |
| 2016/0127254 A1* | 5/2016 | Kumar .................... H04L 47/70 |
| | | 709/226 |
| 2016/0234250 A1* | 8/2016 | Ashley .................. H04L 63/105 |
| 2017/0201600 A1 | 7/2017 | Bauer et al. |
| 2017/0237679 A1* | 8/2017 | Kumar ................ H04L 67/1097 |
| | | 709/226 |
| 2018/0101371 A1* | 4/2018 | Flanakin ............... G06F 3/0484 |
| 2018/0270301 A1* | 9/2018 | Zhang ....................... G06F 9/44 |
| 2018/0359317 A1* | 12/2018 | Muthiah ............. H04L 67/1097 |
| 2019/0075154 A1* | 3/2019 | Zhang .................... H04L 41/147 |
| 2019/0138383 A1* | 5/2019 | Barowy ............... G06F 11/0793 |
| 2019/0205542 A1* | 7/2019 | Kao .................... G06Q 10/0635 |
| 2019/0268283 A1* | 8/2019 | Mukherjee ............. H04L 47/76 |
| 2019/0288915 A1* | 9/2019 | Denyer ................... H04L 41/12 |
| 2019/0297106 A1* | 9/2019 | Geil .................... G06F 16/9024 |

OTHER PUBLICATIONS

Mel, et al., The NIST Definition of Cloud Computing, National Institute of Standards and Technology Special Publication 800-145, Sep. 2011, 7 Pages.

* cited by examiner

DECLARATIVE-BASED REPRESENTATION – INCLEMENT WEATHER, LOAD BALANCER, & BACKUP

500

502:
```
resource "weather" "w10598" {
  zip_code = "10598"
  period = "20"
} resource "openstack_heat_autoscale_stack" "hstack1" {
  steady_state_event_handler = [
    {"event":["${weather.w10598.inclementweather}"],
     "action":["self.schedule_scaleup(${weather.w10598.period})"]}
  ]
}
```

504:
```
resource "load_balancer" "lb1" {
  steady_state_event_handler = [
    {"event":["${vspherespec_vm.vsphere_windows_vm.before_stop}"],
     "action":["self.drain_connections(${vspherespec_vm.vsphere_windows_vm.ip_address})"]},
    {"event":["self.connections_drained(${vspherespec_vm.vsphere_windows_vm.ip_address})"],
     "action":["self.remove(${vspherespec_vm.vsphere_windows_vm.ip_address})"]},
    {"event":["${vspherespec_vm.vsphere_windows_vm.after_start}"],
     "action":["self.add(${vspherespec_vm.vsphere_windows_vm.ip_address})"]}
  ]
}
```

506:
```
resource "veeam_backup" "backup1" {
  steady_state_event_handler = [
    {"event":["${vspherespec_vm.vsphere_windows_vm.uptime > 30 minutes}"
              "${self.last_backup(vspherespec_vm.vsphere_windows_vm.ip_address) > 1 day}"],
     "action":["self.take_backup(${vspherespec_vm.vsphere_windows_vm.ip_address})"]},
    {"event":["${vspherespec_vm.vsphere_windows_vm.before_stop}"],
     "action":["self.disableBackup()"]},
    {"event":["${vspherespec_vm.vsphere_windows_vm.before_restart}"],
     "action":["self.disableBackup()"]},
  ]
}
```

FIG. 5 ations, or any scope of the claims. Its sole purpose is to
ORCHESTRATION ENGINE FACILITATING MANAGEMENT OF OPERATION OF RESOURCE COMPONENTS

BACKGROUND

The subject disclosure relates to cloud computing systems, and more specifically, to orchestration engines for cloud computing systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate orchestration engine components for a cloud computing environment are described.

According to an embodiment, a system can comprise a memory that stores computer executable components and a processor that executes the computer executable components stored in the memory. The computer executable components can comprise a blueprint component that can, based on one or more dependencies between respective resource components of a cloud-based computing platform, declare a steady state action to be executed in response to a steady state event indicative of an event associated with steady state operation of a resource component of the cloud-based computing platform. The computer executable components can further comprise an orchestration engine component that can, based on the blueprint component, execute the steady state action in response to the steady state event.

According to another embodiment, a computer-implemented method can comprise, based on one or more dependencies between respective resource components of a cloud-based computing platform, declaring, by a system operatively coupled to a processor, a steady state action to be executed in response to a steady state event indicative of an event associated with steady state operation of a resource component of the cloud-based computing platform. The computer-implemented method can further comprise, in response to the steady state event, executing, by the system, the steady state action.

According to yet another embodiment, a computer program product that can facilitate an orchestration engine process is provided. The computer program product can comprise a computer readable storage medium having program instructions embodied therewith, the program instructions can be executable by a processing component to cause the processing component to, based on one or more dependencies between respective resource components of a cloud-based computing platform, declare, by the processor, a steady state action to be executed in response to a steady state event indicative of an event associated with steady state operation of a resource component of the cloud-based computing platform. The program instructions can also cause the processing component to, in response to the steady state event, execute, by the processor, the steady state action.

According to another embodiment, a system can comprise a memory that stores computer executable components and a processor that executes the computer executable components stored in the memory. The computer executable components can comprise a learning component that can monitor a cloud-based computing platform to learn one or more dependency characteristics of one or more dependencies between respective resource components of the cloud-based computing platform. The computer executable components can further comprise a blueprint component that can declare a steady state action to be executed in response to a steady state event indicative of an event associated with steady state operation of a resource component of the cloud-based computing platform. The blueprint component can be indicative of a declarative-based machine-readable component. The computer executable components can also comprise an orchestration engine component that can, based on the blueprint component, execute the steady state action in response to the steady state event.

According to still another embodiment, a computer-implemented method can comprise monitoring, by a system operatively coupled to a processor, a cloud-based computing platform to learn one or more dependency characteristics of one or more dependencies between respective resource components of the cloud-based computing platform. The computer-implemented method can further comprise declaring, by the system, a steady state action to be executed in response to a steady state event indicative of an event associated with steady state operation of a resource component of the cloud-based computing platform. The computer-implemented method can further comprise, in response to the steady state event, executing, by the system, the steady state action.

DESCRIPTION OF THE DRAWINGS

FIG. 5 illustrates an example, non-limiting declarative-based representation that facilitates orchestration engine components for a cloud computing environment in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
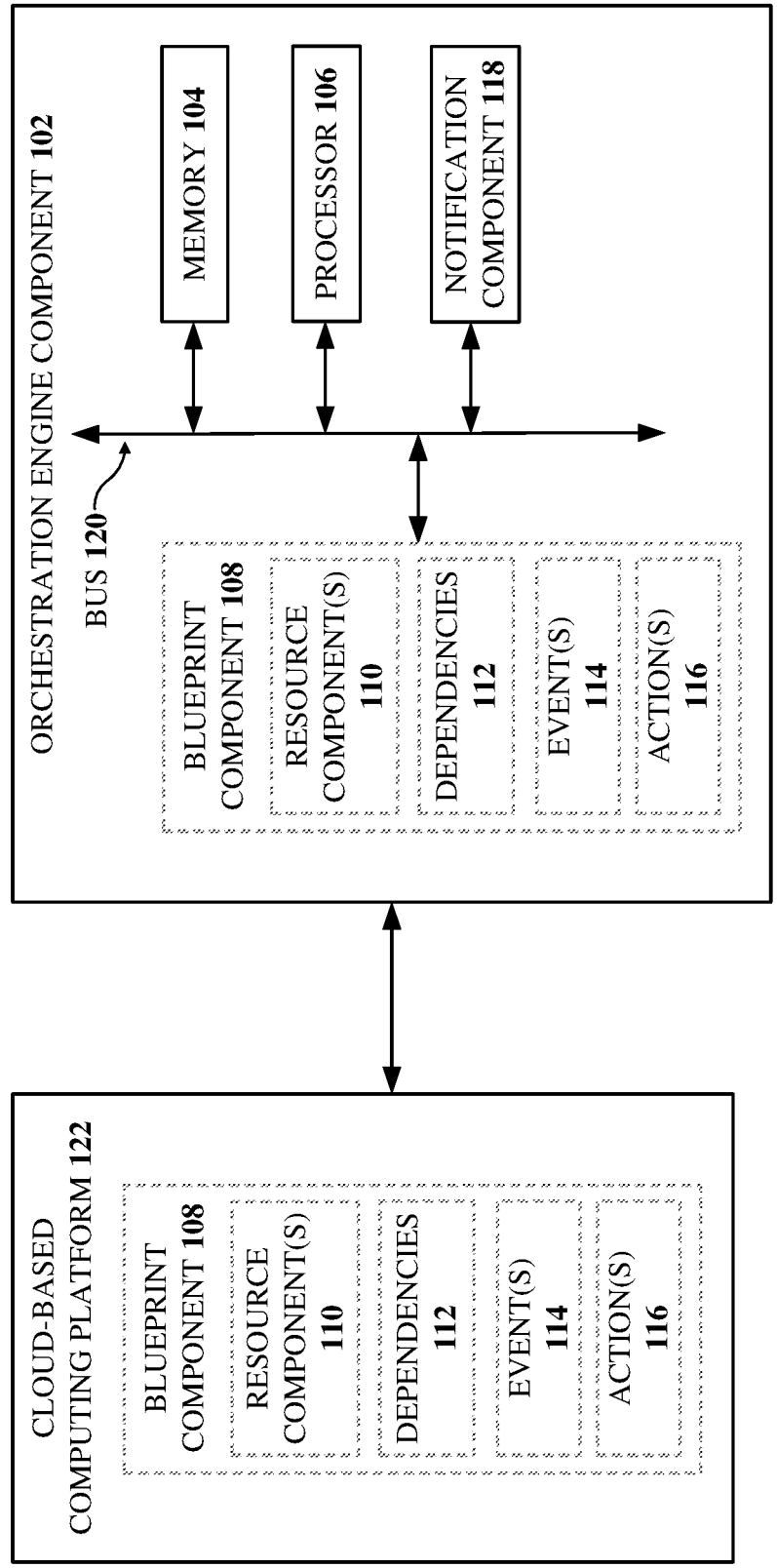
FIG. 1 illustrates a block diagram of an example, non-limiting system that facilitates orchestration engine components for a cloud computing environment in accordance with one or more embodiments described herein.

FIG. 1 illustrates a block diagram of an example, non-limiting system 100 that facilitates orchestration engine components for a cloud computing environment in accordance with one or more embodiments described herein. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise an orchestration engine component 102. In some embodiments, orchestration engine component 102 can comprise a memory 104, a processor 106, a blueprint component 108, a notification component 118, and/or a bus 120. In some embodiments, blueprint component 108 can comprise one or more resource components 110, one or more dependencies 112, one or more events 114, and/or one or more actions 116.

According to some embodiments, orchestration engine component 102 can be in communication (e.g., over a network, such as the Internet) with a cloud-based computing platform 122. In several embodiments, cloud-based computing platform 122 can comprise a cloud computing environment. In some embodiments, cloud-based computing platform 122 can be a private cloud-based computing platform. In other embodiments, cloud-based computing platform 122 can be a community cloud-based computing platform. In yet other embodiments, cloud-based computing platform 122 can be a public cloud-based computing platform. In still other embodiments, cloud-based computing platform 122 can be a hybrid cloud-based computing platform. In some embodiments, cloud-based computing platform 122 can comprise blueprint component 108.

It should be appreciated that the embodiments of the subject disclosure depicted in various figures disclosed herein are for illustration only, and as such, the architecture of such embodiments are not limited to the systems, devices, aspects, and/or components depicted therein. For example, in some embodiments, system 100 and/or orchestration engine component 102 can further comprise various computer and/or computing-based elements described herein with reference to operating environment 800 and FIG. 8. In several embodiments, such computer and/or computing-based elements can be used in connection with implementing one or more of the systems, devices, aspects, and/or components shown and described in connection with FIG. 1 or other figures disclosed herein.

Figure 9:
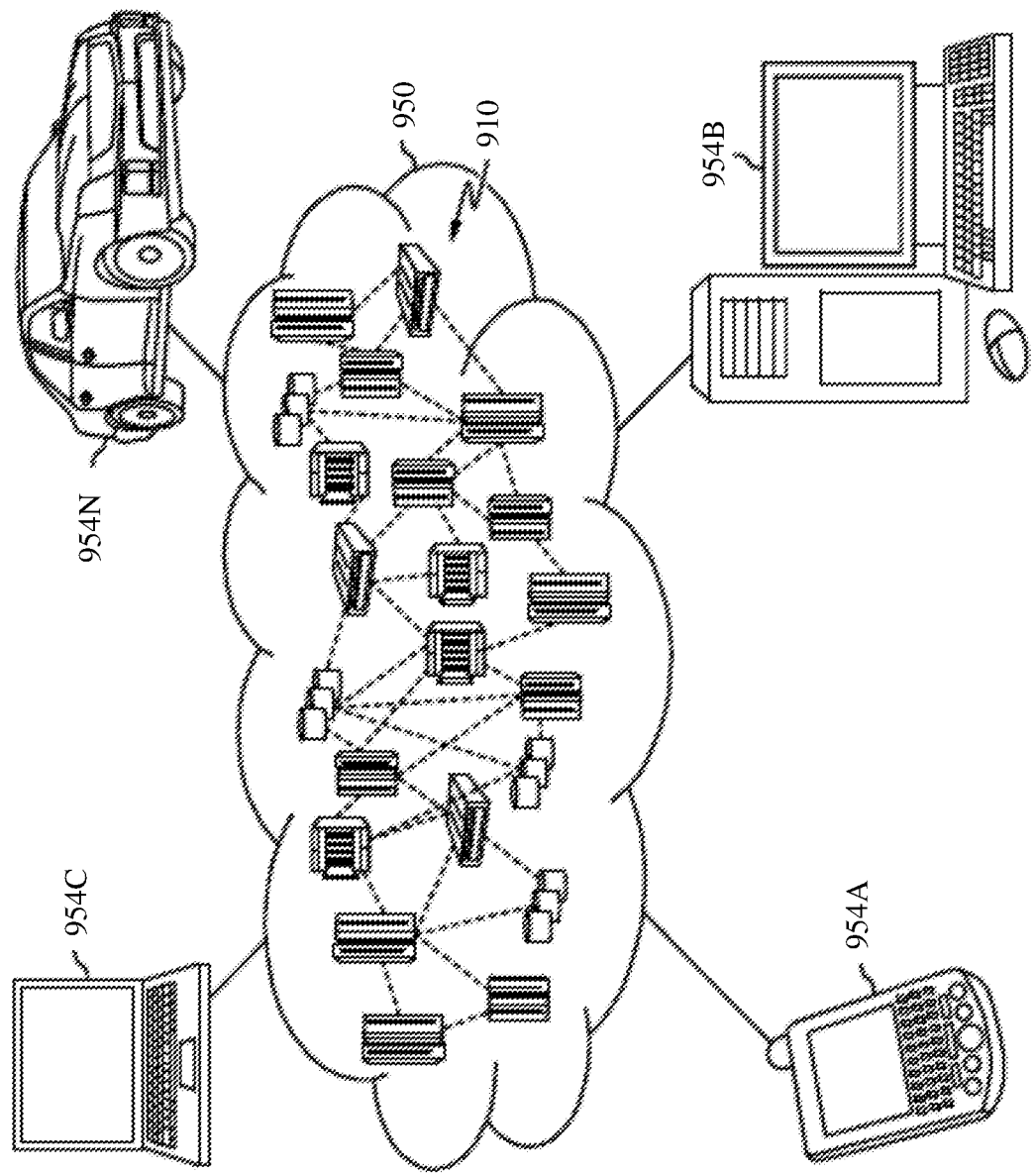
FIG. 9 illustrates a block diagram of an example, non-limiting cloud computing environment in accordance with one or more embodiments of the subject disclosure.

In other embodiments, system 100 and/or cloud-based computing platform 122 can further comprise various cloud computing nodes described herein with reference to cloud computing environment 950 and FIG. 9. In some embodiments, system 100 and/or cloud-based computing platform 122 can further comprise various functional abstraction layers described herein with reference to hardware and software layer 1060, virtualization layer 1070, management layer 1080, and/or workloads layer 1090 and FIG. 10.

According to several embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to orchestration engine component 102, blueprint component 108, resource components 110, dependencies 112, events 114, actions 116, notification component 118, and/or cloud-based computing platform 122.

In several embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

According to some embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or the like.

In some embodiments, orchestration engine component 102, memory 104, processor 106, blueprint component 108, and/or notification component 118 can be communicatively, electrically, and/or operatively coupled to one another via a bus 120 to perform functions of system 100, orchestration engine component 102, and/or any components coupled therewith. In several embodiments, bus 120 can comprise one or more memory bus, memory controller, peripheral bus, external bus, local bus, and/or the like that can employ various bus architectures. Further examples of bus 120 are described below with reference to system bus 818 and FIG. 8. Such examples of bus 120 can be employed to implement any embodiments of the subject disclosure.

In several embodiments, orchestration engine component 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with orchestration engine component 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, blueprint component 108, notification component 118, and/or any other components associated with (e.g., communicatively/electronically/operatively coupled with and/or employed by) orchestration engine component 102, can comprise such computer and/or machine readable, writable, and/or executable component(s) and/or instruction(s). Consequently, according to numerous embodiments, orchestration engine component 102 and/or any components associated therewith, can employ processor 106 to execute such computer and/or machine readable, writable, and/or executable component(s) and/or instruction(s) to facilitate performance of one or more operations described herein with reference to orchestration engine component 102 and/or any such components associated therewith.

In some embodiments, orchestration engine component 102 can comprise and/or employ one or more declarative-based components (e.g., developed with declarative syntax, as opposed to imperative syntax). For example, blueprint component 108, resource components 110, dependencies 112, events 114, actions 116, notification component 118, and/or any other components associated with orchestration engine component 102, can comprise declarative-based computer and/or machine readable, writable, and/or executable components. According to several embodiments, such declarative-based components can describe what results the component must accomplish, rather than explicitly specifying step-by-step instructions for how to accomplish the desired results. In several embodiments, orchestration engine component 102 can facilitate: interpreting the desired results the respective declarative-based components must accomplish; determining how to achieve such results; and/or executing various operations described herein to achieve such results.

According to multiple embodiments, orchestration engine component 102 can facilitate performance of operations related to managing blueprint component 108, resource components 110, dependencies 112, events 114, and/or actions 116 associated with cloud-based computing platform 122. For example, orchestration engine component 102 can facilitate performance of various steady state tasks (e.g., operational tasks) associated with resource components 110 (e.g., monitoring, load balancing, automatic scaling, etc.). As referenced herein, the terms "steady state" and/or "operational" describe a period during the lifecycle of a resource in which the resource is operating and/or executing one or more workloads (e.g., processing tasks, storing tasks, etc.) associated with a cloud computing environment.

According to numerous embodiments, orchestration engine component 102 can employ one or more blueprint components 108 to facilitate performance of various steady state/operational tasks associated with resource components 110 (e.g., monitoring, load balancing, automatic scaling, etc.). For example, orchestration engine component 102 can facilitate performance of such steady state/operational tasks based on the contents and/or the declarations of blueprint component 108, which orchestration engine component 102 can interpret and/or execute (e.g., via reading, writing, and/or executing a text file representation of blueprint component 108).

In several embodiments, blueprint component 108 can comprise and/or declare (e.g., specify) one or more resource components 110 and/or one or more compositions of solutions to achieve a goal associated with cloud-based computing platform 122 (e.g., execution of one or more workloads associated with cloud-based computing platform 122). For example, blueprint component 108 can comprise and/or declare one or more resource components 110, one or more dependencies 112, one or more events 114, and/or one or more actions 116 required to execute one or more workloads (e.g., processing tasks, storing tasks, etc.) associated with cloud-based computing platform 122.

In several embodiments, blueprint component 108 can comprise a template and/or a pattern comprising one or more representations of resource components 110, dependencies 112, events 114, and/or actions 116 required to execute a workload(s) associated with cloud-based computing platform 122. For example, such one or more representations can include, but are not limited to, declarative representations, graphical representations, and/or textual representations. In some embodiments, blueprint component 108 can comprise a template and/or a pattern comprising one or more declarative, graphical, and/or textual representations that can be formatted in a computer and/or machine readable, writable, and/or executable format and/or a human readable format, such as, for example, a text file (e.g., JavaScript Object Notation (JSON), HashiCorp Configuration Language (HCL), YAML Ain't Markup Language (YAML), etc.). For example, such a text file format can comprise a data serialization language (e.g., YAML), a declarative language, automated documentation, and/or the like.

In some embodiments, blueprint component 108 can comprise and/or declare the type and/or properties of resource components 110. For example, blueprint component 108 can declare the type (e.g., processor, virtual machine, storage, middleware, hardware, software, etc.) and/or the properties of such resource components 110 (e.g., domain, access compliance key/value, image, region, public network speed, processing capacity, storage capacity, compatibility, etc.).

In multiple embodiments, the resource requirements for executing one or more workloads associated with cloud-based computing platform 122 can be indicative of hardware characteristics, software characteristics, middleware characteristics, service characteristics, infrastructure characteristics, and/or the like, required for executing such workloads. For example, such resource requirements can include, but are not limited to, operating system requirements, memory requirements, processing requirements, service requirements (e.g., backup, patch, monitoring, endpoint protection, etc.), infrastructure requirements (e.g., servers, virtual machines, networks, etc.), and/or other resource requirements. Consequently, according to numerous embodiments, resource component 110 can comprise one or more resources (e.g., computing resources) for hardware and/or software associated with cloud-based computing platform 122. In other embodiments, resource component 110 can comprise one or more resources for a processor, a virtual machine, an infrastructure, storage, middleware, services (e.g., backup, patch, monitoring, endpoint protection, etc.), and/or one or more other resources, all of which can be associated with cloud-based computing platform 122.

According to some embodiments, blueprint component 108 can comprise and/or declare one or more inter-relationships and/or dependencies between various resource components 110. For example, blueprint component 108 can declare various resource components 110, as well as dependencies 112 that can define the sequence (e.g., order of execution or execution path) by which orchestration engine component 102 and/or such resource components 110 can facilitate execution of various provisioning tasks and/or steady state/operational tasks associated with such resource components 110. For instance, blueprint component 108 can declare one or more independent resource components and, based on dependencies 112, blueprint component 108 can further declare one or more dependent resource components that can be dependent on such independent resource components. In such an example, orchestration engine component 102 and/or a dependent resource component cannot execute an action (e.g., a provisioning task and/or steady state/operational task) until the independent resource component upon which the dependent resource component depends, executes one or more tasks associated with the independent resource component (e.g., a provisioning task and/or steady state/operational task).

In some embodiments, dependencies 112 can define one or more aspects of one or more operations associated with one or more resource components 110. For example, such aspects can include, but are not limited to, status, functionality, declaration, timing, schedule, and/or a sequence of executing one or more operations that can include, but are not limited to, shutdown operation, pause operation, alert operation, and/or provisioning operation. In some embodiments, dependencies 112 can comprise single dependencies and/or multiple dependencies. In some embodiments, dependencies 112 can comprise single dimension dependencies and/or multidimensional dependencies (e.g., numerous dimensions of dependence properties). In some embodiments, dependencies 112 can be associated with various risks that can include, but are not limited to, single dependency risk, multiple dependencies risk, single dimension dependency risk, multiple dimension dependency risk, workload performance risk, failure risk, security risk, and/or financial risk.

According to some embodiments, blueprint component 108 can comprise and/or declare one or more events 114 associated with one or more resource components 110 declared in blueprint component 108. For example, blueprint component 108 can declare various events 114 that can occur during provisioning and/or steady state/operation of resource components 110. In an embodiment, blueprint component 108 can declare pre-event, event, and/or post-event declarations for various provisioning and/or steady state/operational activities associated with resource components 110 (e.g., pre-create, creating, post-create, pre-start, starting, post-start, pre-stop, stopping, post-stop, pre-update, updating, post-update, pre-delete, deleting, post-delete, etc.). In another embodiment, blueprint component 108 can declare events 114 that can be planned, scheduled, and/or expected to occur (e.g., maintenance, patching, workload increase, etc.). In still another embodiment, blueprint component 108 can declare events 114 that can be unplanned and/or unexpected, which may or may not occur (e.g., malfunction, inoperability, etc.).

In some embodiments, blueprint component 108 can comprise and/or declare one or more actions 116 associated with one or more resource components 110 declared in blueprint component 108. For example, blueprint component 108 can declare various actions 116 that can be executed by orchestration engine component 102 and/or resource components 110 during provisioning and/or steady state/operation of such resource components 110. In some embodiments, blueprint component 108 can declare one or more discrete actions 116 corresponding to one or more discrete events 114. For instance, blueprint component 108 can declare an action 116 (e.g., suspending a monitoring service associated with a resource component 110) that corresponds to an event 114 (e.g., shutdown of such resource component 110). In this example, based on such an event 114 and action 116 declared in blueprint component 108, orchestration engine component 102 can facilitate suspending a monitoring service for a resource component 110 in response to the shutdown of resource component 110.

According to some embodiments, blueprint component 108 can declare events 114 and/or actions 116 based on one or more dependencies 112 between resource components 110. For example, blueprint component 108 can declare a virtual machine resource component and a monitoring service resource component that can be dependent on the virtual machine resource component. In such an example, blueprint component 108 can further declare an action 116 (e.g., to suspend monitoring service of the virtual machine resource component) that can be executed (e.g., by orchestration engine component 102 and/or the monitoring service resource component) in response to occurrence of an event 114 (e.g., a shutdown event of the virtual machine resource component). In this example, in response to the occurrence of a shutdown event of the virtual machine resource component, orchestration engine component 102 and/or the monitoring service resource component can suspend monitoring service of the virtual machine resource component.

In some embodiments, blueprint component 108 can declare events 114 and/or actions 116 based on one or more estimated risk levels associated with one or more dependencies 112 between resource components 110. For example, blueprint component 108 can declare an action 116 and a corresponding event 114 based on one or more dependencies 112 having the lowest estimated risk level associated therewith (e.g., single dependency risk as opposed to multiple dependencies risk). In some embodiments, the estimated risk level associated with one or more dependencies 112 can be a scalar value, a multidimensional vector, and/or a confidence value.

According to some embodiments, blueprint component 108 can declare resource components 110 based on one or more dependencies 112, one or more events 114, and/or one or more actions 116 declared in blueprint component 108. For example, blueprint component 108 can declare the type of resource component 110 (e.g., virtual machine, etc.) and/or one or more properties of such resource component 110 (e.g., domain, access compliance key/value, image, region, public network speed, processing capacity, etc.) based on one or more dependencies 112 (and/or the one or more estimated risk levels associated such dependencies 112), one or more events 114, and/or one or more actions 116 declared in blueprint component 108.

In some embodiments, orchestration engine component 102 can facilitate generating one or more blueprint components 108. For example, orchestration engine component 102 can employ a computing resource (e.g., a virtual machine computing resource of cloud-based computing platform 122) to generate one or more blueprint components 108. In such an example, orchestration engine component 102 can employ a virtual machine computing resource of cloud-based computing platform 122 to declare one or more resource components 110, dependencies 112, events 114, and/or actions 116 required to execute one or more workloads associated with cloud-based computing platform 122.

In FIG. 1, blueprint component 108, resource components 110, dependencies 112, events 114, and actions 116 are depicted with dashed lines to indicate that, according to some embodiments, these components can be transmitted and/or received by orchestration engine component 102 (e.g., via a network, such as the Internet). According to some embodiments, orchestration engine component 102 can transmit (e.g., export) blueprint component 108 to cloud-based computing platform 122 to facilitate employment of blueprint component 108 by cloud-based computing platform 122 and/or computing resources associated therewith. In other embodiments, orchestration engine component 102 can receive (e.g., import) one or more blueprint components 108 associated with cloud-based computing platform 122.

In some embodiments, orchestration engine component 102 can facilitate interpreting, altering, and/or replacing blueprint component 108 and/or the contents/declarations of blueprint component 108 (e.g., via reading and/or writing a text file representation of blueprint component 108) to facilitate performance of various operations related to managing resource components 110, dependencies 112, events 114, and/or actions 116 declared therein. In an embodiment, orchestration engine component 102 can interpret, alter (e.g., modify, update, delete, etc.), and/or replace resource components 110, dependencies 112, events 114, and/or actions 116 declared in a blueprint component 108. In another embodiment, orchestration engine component 102 can replace a blueprint component 108 with another blueprint component received by orchestration engine component 102 (e.g., a blueprint component other than blueprint component 108). In still another embodiment, orchestration engine component 102 can interpret, alter, and/or replace one or more resource components, one or more dependencies, one or more events, and/or one or more actions declared in a blueprint component received by orchestration engine component 102 (e.g., via reading and/or writing a text file representation of the blueprint component received by orchestration engine component 102).

According to some embodiments, orchestration engine component 102 can dynamically (e.g., repeatedly, continuously, etc.) alter and/or replace a blueprint component 108 and/or the contents/declarations of such blueprint component 108 (e.g., resource components 110, dependencies 112, events 114, and/or actions 116) based on an estimated risk level associated with such blueprint component 108 and/or the contents/declarations of such blueprint component 108. For example, orchestration engine component 102 can dynamically alter and/or replace a blueprint component 108 and/or the contents/declarations of such blueprint component 108 based on an estimated risk level associated with one or more dependencies 112 declared in such blueprint component 108 (e.g., single dependency risk as opposed to multiple dependencies risk). In some embodiments, the estimated risk level associated with a blueprint component 108 and/or the contents/declarations of such blueprint component 108 can be a scalar value, a multidimensional vector, and/or a confidence value.

In some embodiments, orchestration engine component 102 can dynamically alter and/or replace a blueprint component 108 and/or the contents/declarations of such blueprint component 108 based on an estimated benefit of using the altered blueprint component 108 and/or the altered contents/declarations of such blueprint component 108. Examples of such estimated benefit(s) can include, but are not limited to, cost, performance, security, reliability, robustness, business impact, and/or the like.

In several embodiments, orchestration engine component 102 can facilitate storing one or more blueprint components 108, and/or the contents declared therein, on a local storage component (e.g., memory 104) and/or a remote storage component. For instance, orchestration engine component 102, and/or components associated therewith, can employ memory 104 to store one or more blueprint components 108, and/or the contents declared therein, such as, for example, one or more representations of resource components 110, dependencies 112, events 114, and/or actions 116. For example, orchestration engine component 102, and/or components associated therewith, can employ memory 104 to store one or more text files comprising declarative representations of resource components 110, dependencies 112, events 114, and/or actions 116.

In several embodiments, orchestration engine component 102 can generate a blueprint component 108 that declares one or more events 114 and/or one or more actions 116 based on one or more resource components and/or one or more dependencies declared in a blueprint component received by orchestration engine component 102. In such embodiments, based on one or more events 114 and corresponding actions 116 declared in the newly generated blueprint component 108, orchestration engine component 102 can further facilitate executing one or more actions 116 in response to the occurrence of one or more events 114. In still other embodiments, orchestration engine component 102 can generate a blueprint component 108 that declares one or more events 114 and/or one or more actions 116 based on one or more resource components 110 and/or one or more dependencies 112 declared in an existing blueprint component 108 (e.g., previously generated by orchestration engine component 102). In such embodiments, based on one or more events 114 and corresponding actions 116 declared in the newly generated blueprint component 108, orchestration engine component 102 can further facilitate executing one or more actions 116 in response to the occurrence of one or more events 114.

In multiple embodiments, orchestration engine component 102 can employ notification component 118 to generate, render, and/or transmit information indicative of an occurrence of one or more events 114 and/or indicative of the execution of one or more actions 116. To facilitate generating, rendering, and/or transmitting such information according to multiple illustrations, orchestration engine component 102 and/or notification component 118 can comprise and/or be coupled with (e.g., communicatively, electrically, operatively, etc.) various communication components (not illustrated in FIG. 1) that can provide for generating, rendering, and/or transmitting such information to an entity and/or an entity device (e.g., a computer, a smart phone, wearable computing device, and/or the like). For example, orchestration engine component 102 and/or notification component 118 can include and/or be coupled with various hardware and/or software components that can provide for generating, rendering, and/or transmitting such information (e.g., via a network, such as the Internet). For instance, orchestration engine component 102 and/or notification component 118 can include and/or be coupled with various computer input/output devices (e.g., a mouse, a keyboard, a display monitor, speakers, etc.), an operating system, and/or one or more software applications suitable for generating, rendering, and/or transmitting such information to an entity/entity device (e.g., electronic mail (e-mail) application, text messaging application, push notification application, and/or the like).

According to some embodiments, in response to an occurrence of one or more events 114, orchestration engine component 102 and/or notification component 118 can employ one or more of the various communication components described above to facilitate generating, rendering, and/or transmitting information indicative of such occurrence (e.g., via transmitting over a network (e.g., the Internet) an e-mail message, text message, a push notification, initiating a call, turning on a light or activating a sensor, causing a letter to be printed or causing any other physical world change or electronic output to occur, to an entity device, such as a computer, a smart phone, a wearable computing device, etc.). In other embodiments, in response to the execution of one or more actions 116, orchestration engine component 102 and/or notification component 118 can employ one or more of the various communication components described above to facilitate generating, rendering, and/or transmitting information indicative of such execution (e.g., via transmitting over a network (e.g., the Internet) an e-mail message, text message, a push notification, initiating a call, turning on a light or activating a sensor, causing a letter to be printed or causing any other physical world change or electronic output to occur, to an entity device, such as a computer, a smart phone, a wearable computing device, etc.).

In numerous embodiments, orchestration engine component 102, and/or components associated therewith (e.g., blueprint component 108, notification component 118, etc.), can be controlled, defined, manipulated, and/or modified by an entity (e.g., an animate entity, such as a human, for example). For instance, orchestration engine component 102, and/or components associated therewith (e.g., blueprint component 108, notification component 118, etc.), can comprise one or more user interfaces (e.g., graphical user interface (GUI), form-based interface, natural language interface, etc.) that enable an entity (e.g., a human) to input instructions and/or commands to the orchestration engine component 102, and/or components associated therewith. For instance, an entity (e.g., a human) can employ a computing device (e.g., a computer having a keyboard, mouse, and/or monitor) comprising orchestration engine component 102, and/or components associated therewith (e.g., blueprint component 108, notification component 118, etc.), to input such instructions and/or commands to orchestration engine component 102 and/or components associated therewith (e.g., via a graphical user interface (GUI)). In this example, inputting such instructions and/or commands can facilitate controlling, defining, manipulating, and/or modifying orchestration engine component 102, and/or components associated therewith.

In some embodiments, an entity (e.g., a human) can control, define, manipulate, and/or modify (e.g., as described above) blueprint component 108 and/or various features of blueprint component 108, including but not limited to, one or more resource components 110, dependencies 112, events 114, and/or actions 116 declared therein. In some embodiments, an entity can control, define, manipulate, and/or modify blueprint component 108 and/or various features of blueprint component 108 based on: one or more estimated risk levels associated with one or more dependencies 112 (e.g., workload performance risk, failure risk, security risk, financial risk, etc.); one or more estimated benefits of using such controlled, defined, manipulated, and/or modified blueprint component 108; one or more events that are planned, scheduled, and/or expected to occur (e.g., maintenance, patching, workload increase, etc.); and/or one or more events that are unplanned and/or unexpected, which may or may not occur (e.g., malfunction, inoperability, etc.).

Figure 2:
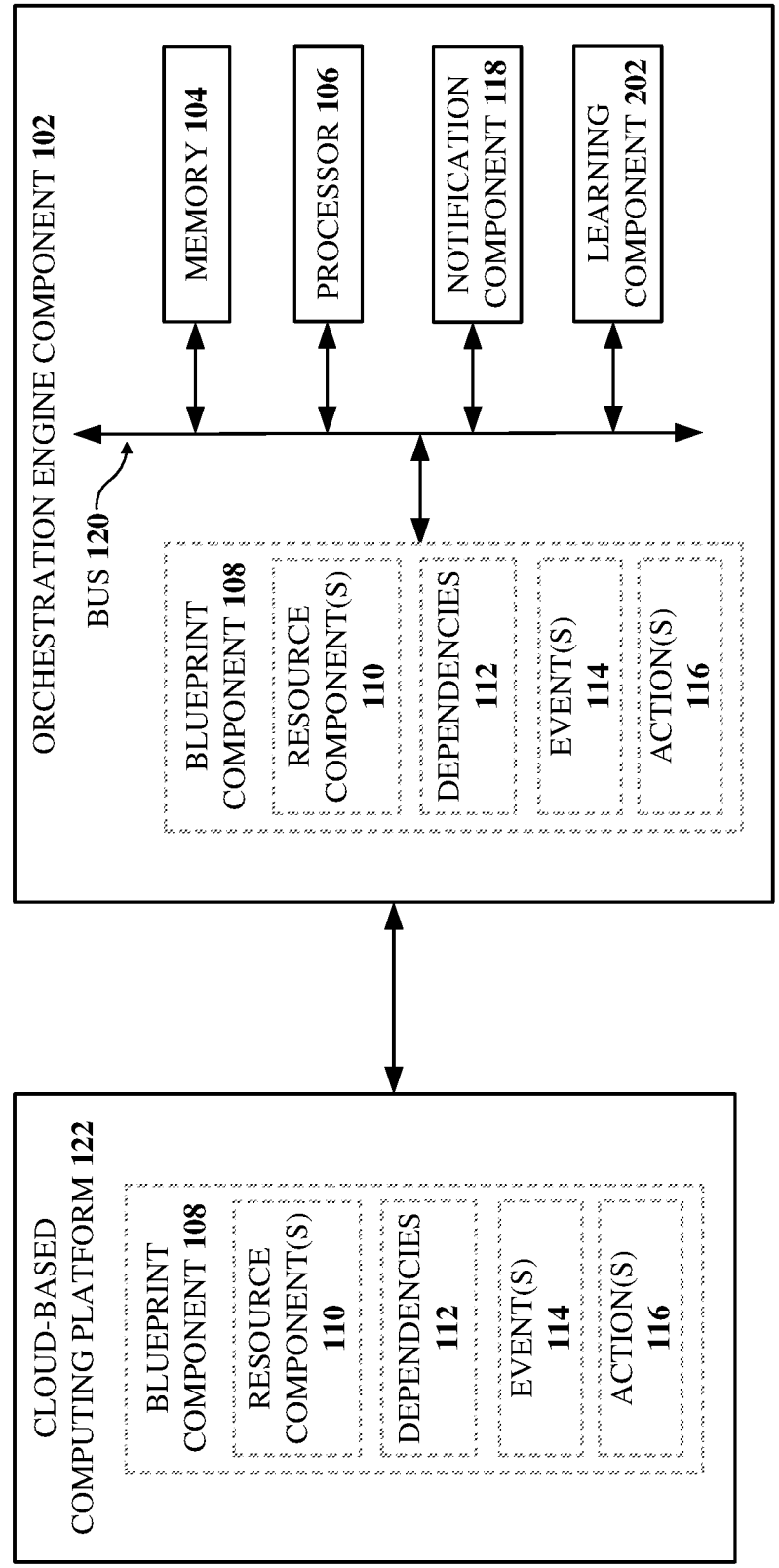
FIG. 2 illustrates a block diagram of an example, non-limiting system that facilitates orchestration engine components for a cloud computing environment in accordance with one or more embodiments described herein.

FIG. 2 illustrates a block diagram of another example, non-limiting system 200 that facilitates orchestration engine components for a cloud computing environment in accordance with one or more embodiments described herein. Repetitive description of like elements employed in respective embodiments is omitted for sake of brevity. In the embodiment shown in FIG. 2, system 200 and/or orchestration engine component 102 can comprise a learning component 202.

According to several embodiments, orchestration engine component 102 can employ learning component 202 to facilitate monitoring and/or analyzing cloud-based computing platform 122 to learn one or more dependency characteristics of one or more dependencies 112 between resource components 110. For example, learning component 202 can monitor and/or analyze cloud-based computing platform 122 based on blueprint component 108 and/or the contents/declarations of blueprint component 108 (e.g., resource components 110, dependencies 112, events 114, and/or actions 116) to learn one or more dependency characteristics of one or more dependencies 112 between resource components 110. For instance, learning component 202 can monitor and/or analyze cloud-based computing platform 122 to learn one or more dependency characteristics by: monitoring/analyzing history of one or more dependencies 112; monitoring/analyzing previous performance of one or more workloads of cloud-based computing platform 122; monitoring/analyzing previous performance of one or more actions 116 executed in response to the occurrence of one or more events 114; and/or crowdsourcing.

According to some embodiments, in response to learning component 202 learning one or more dependency characteristics (e.g., via monitoring/analyzing the performance of an action 116 executed in response to an event 114), orchestration engine component 102 and/or learning component 202 can facilitate generating a blueprint component 108 that declares one or more resource components 110, dependencies 112, events 114, and/or actions 116 based on the one or more dependency characteristics learned by learning component 202. In some embodiments, in response to learning component 202 learning one or more dependency characteristics, orchestration engine component 102 and/or learning component 202 can facilitate modifying an existing blueprint component (e.g., a blueprint component received by orchestration engine component 102 and/or a blueprint component previously generated by orchestration engine component 102) such that the modified blueprint component declares one or more resource components 110, dependencies 112, events 114, and/or actions 116 based on the one or more dependency characteristics learned by learning component 202.

In some embodiments, learning component 202 can employ machine learning and/or principles of artificial intelligence to learn one or more dependency characteristics of one or more dependencies 112. In some embodiments, learning component 202 can learn one or more dependency characteristics of one or more dependencies 112 explicitly or implicitly. In an embodiment, learning component 202 can learn one or more dependency characteristics of one or more dependencies 112 based on classifications, correlations, inferences and/or expressions associated with principles of artificial intelligence. For instance, learning component 202 can employ an automatic classification system and/or an automatic classification process to learn one or more dependency characteristics of one or more dependencies 112. In one embodiment, learning component 202 can employ a probabilistic and/or statistical-based analysis (e.g., factoring into the analysis utilities and costs) to learn and/or generate inferences with respect to one or more dependency characteristics of one or more dependencies 112. In another embodiment, learning component 202 can include an inference component (not illustrated in FIG. 2) that can further enhance automated aspects of learning component 202 utilizing in part inference-based schemes to learn one or more dependency characteristics of one or more dependencies 112.

According to some embodiments, learning component 202 can employ any suitable machine-learning based techniques, statistical-based techniques, and/or probabilistic-based techniques. For example, learning component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In some embodiments, learning component 202 can perform a set of machine learning computations associated with learning one or more dependency characteristics of one or more dependencies 112. For example, learning component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more dependency characteristics of one or more dependencies 112.

In some embodiments, learning component 202 can apply a certain degree of random variation to a blueprint component 108 and/or the contents/declarations of a blueprint component 108 (e.g., resource components 110, dependencies 112, events 114, and/or actions 116) to learn one or more parameters for blueprint component 108 and/or the contents/declarations of blueprint component 108. In some embodiments, orchestration engine component 102 and/or learning component 202 can dynamically alter and/or control an amount of random variation to a blueprint component 108 and/or the contents/declarations of a blueprint component 108. For example, learning component 202 can alter a monitoring aspect parameter, an alarm aspect parameter, a load-balancing aspect parameter, and/or another aspect parameter to monitor workload performance of cloud-based computing platform 122.

According to some embodiments, in response to learning component 202 learning one or more dependency characteristics (e.g., via monitoring/analyzing the performance of an action 116 executed in response to an event 114), orchestration engine component 102 and/or learning component 202 can facilitate storing the one or more dependency characteristics learned by learning component 202. For example, orchestration engine component 102 and/or learning component 202 can facilitate storing such one or more dependency characteristics on memory 104. In other embodiments, in response to learning component 202 learning one or more dependency characteristics, orchestration engine component 102 and/or learning component 202 can facilitate generating, rendering, and/or transmitting information indicative of such one or more dependency characteristics learned by learning component 202. For example, orchestration engine component 102 and/or learning component 202 can employ notification component 118 to facilitate generating, rendering, and/or transmitting (e.g., as described above with reference to FIG. 1) information indicative of such one or more dependency characteristics learned by learning component 202.

Figure 3:
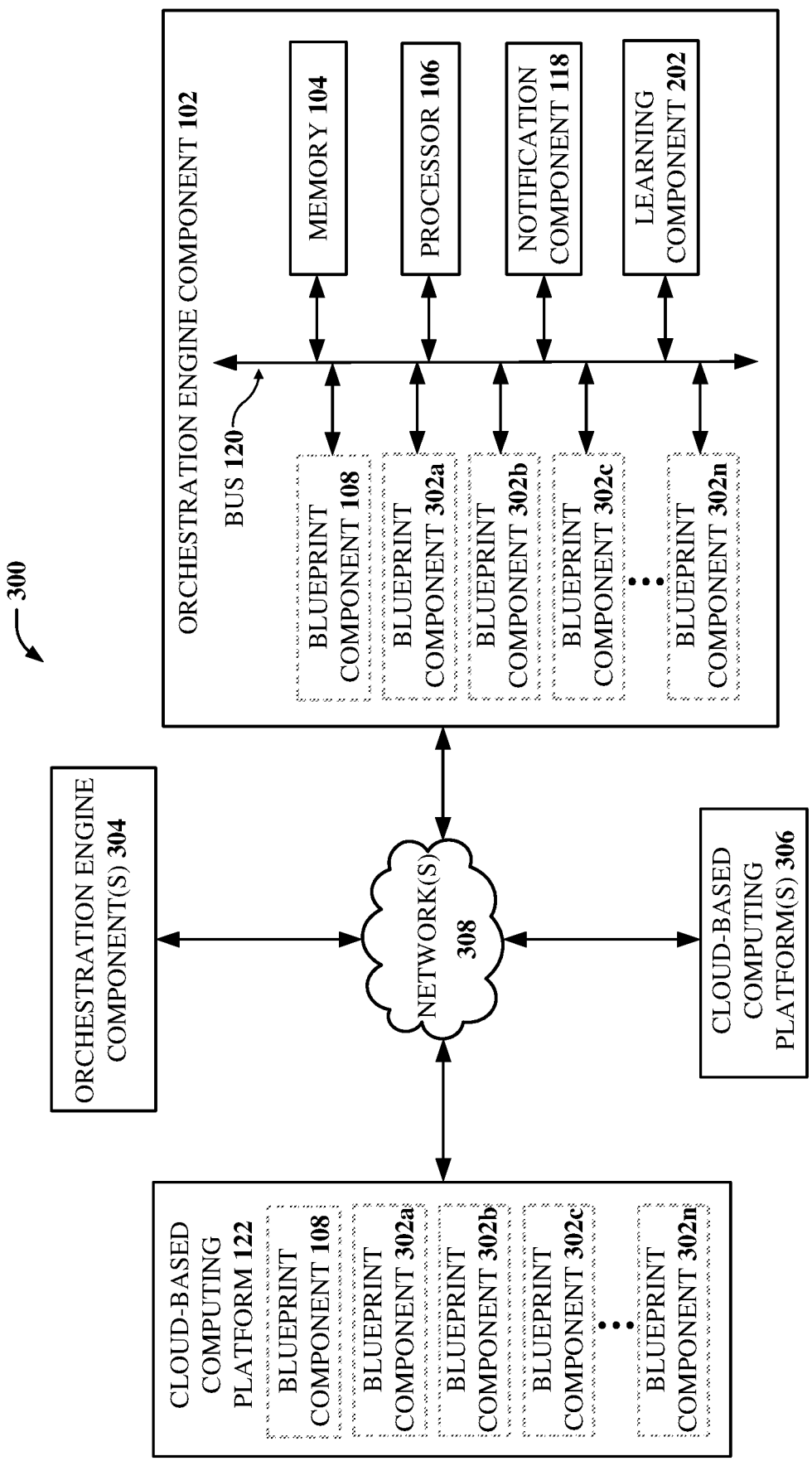
FIG. 3 illustrates a block diagram of an example, non-limiting system that facilitates orchestration engine components for a cloud computing environment in accordance with one or more embodiments described herein.

FIG. 3 illustrates a block diagram of another example, non-limiting system 300 that facilitates orchestration engine components for a cloud computing environment in accordance with one or more embodiments described herein. Repetitive description of like elements employed in respective embodiments is omitted for sake of brevity.

In the embodiment shown in FIG. 3, system 300 can comprise orchestration engine component 102, cloud-based computing platform 122, one or more other orchestration engine components 304, one or more other cloud-based computing platforms 306, and/or one or more networks 308. In some embodiments, orchestration engine component 102 and/or cloud-based computing platform 122 can comprise one or more other blueprint components 302a, 302b, 302c, 302n.

In multiple embodiments, blueprint components 302a, 302b, 302c, 302n can be the same as, similar to, or different from blueprint component 108 described above with reference to FIG. 1 and FIG. 2. For example, blueprint components 302a, 302b, 302c, 302n can comprise and/or declare the same, similar, or different resource components, dependencies, events, actions, properties, formats, functionalities, etc., as blueprint component 108 described above with reference to FIG. 1 and FIG. 2.

According to some embodiments, blueprint components 302a, 302b, 302c, 302n can be generated by one or more orchestration engine components 304. In FIG. 3, blueprint components 302a, 302b, 302c, 302n are depicted with dashed lines to indicate that, according to some embodiments, blueprint components 302a, 302b, 302c, 302n can be transmitted and/or received (e.g., via networks 308) by orchestration engine component 102 and/or orchestration engine components 304. For example, blueprint components 302a, 302b, 302c, 302n can be transmitted, by orchestration engine components 304, via networks 308, to cloud-based computing platform 122 and/or cloud-based computing platforms 306 to facilitate employment of such blueprint components 302a, 302b, 302c, 302n by cloud-based computing platform 122 and/or cloud-based computing platforms 306. In several embodiments, orchestration engine component 102 can receive and/or retrieve blueprint components 302a, 302b, 302c, 302n from cloud-based computing platform 122, orchestration engine components 304, and/or cloud-based computing platforms 306.

In some embodiments, orchestration engine component 102 can facilitate interpreting content of the blueprint components 302a, 302b, 302c, 302n (e.g., via reading text file representations of blueprint components 302a, 302b, 302c, 302n) to facilitate performance of various operations related to managing one or more resource components, dependencies, events, and/or actions declared therein (e.g., as described above with reference to orchestration engine component 102 and/or blueprint component 108, as well as FIG. 1 and FIG. 2). In some embodiments, orchestration engine component 102 can interpret, alter (e.g., modify, update, delete, etc.), and/or replace blueprint components 302a, 302b, 302c, 302n and/or the contents/declarations of such blueprint components 302a, 302b, 302c, 302n (e.g., resource components, dependencies, events, and/or actions declared therein). For example, orchestration engine component 102 can generate one or more blueprint components 108 based on blueprint components 302a, 302b, 302c, 302n and/or the contents/declarations of such blueprint components 302a, 302b, 302c, 302n. In still another example, orchestration engine component 102 can facilitate execution of one or more actions (e.g., actions 116) that can be declared in blueprint components 302a, 302b, 302c, 302n. In other embodiments, orchestration engine component 102 can further facilitate performance of any and/or all other operations (e.g., with respect to blueprint components 302a, 302b, 302c, 302n) as described herein with reference to notification component 118 and/or learning component 202, as well as FIG. 1 and FIG. 2.

In some embodiments, orchestration engine components 304 can be the same as, similar to, or different from orchestration engine component 102 described above with reference to FIG. 1 and FIG. 2. For example, orchestration engine components 304 can comprise the same, similar, or different components, properties, formats, functionalities, etc., as orchestration engine component 102 described above with reference to FIG. 1 and FIG. 2. In some embodiments, cloud-based computing platforms 306 can be the same as, similar to, or different from cloud-based computing platform 122 described above with reference to FIG. 1 and FIG. 2. For example, cloud-based computing platforms 306 can comprise the same, similar, or different components, properties, formats, functionalities, etc., as cloud-based computing platform 122 described above with reference to FIG. 1 and FIG. 2.

In some embodiments, networks 308 can include wired and/or wireless networks, including, but not limited to, a cellular network, a wide area network (WAN) (e.g., the Internet) or a local area network (LAN). For example, networks 308 can comprise wired or wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, orchestration engine component 102 can thus include hardware (e.g., a central processing unit (CPU), a transceiver, a decoder), software (e.g., a set of threads, a set of processes, software in execution) or a combination of hardware and software that facilitates communicating information between orchestration engine component 102 and external systems, sources, and/or devices.

In some embodiments, orchestration engine component 102 can be an orchestration engine system and/or an orchestration engine process associated with technologies such as, but not limited to, cloud computing technologies, computer technologies, server technologies, information technologies, machine learning technologies, artificial intelligence technologies, digital technologies, data analysis technologies, and/or other computer technologies. In some embodiments, orchestration engine component 102 can employ hardware and/or software to solve problems that are highly technical in nature, that are not abstract and that cannot be performed as a set of mental acts by a human. For example, by employing a blueprint component that declares one or more events associated with the steady state operation of a resource of a cloud computing environment and further declares one or more corresponding actions to be executed in response to the occurrence of such event(s), orchestration engine component 102 can automatically detect the occurrence of such event(s) and can further execute such action(s) in response to the occurrence of such event(s), throughout the lifecycle of such resource components.

In some embodiments, orchestration engine component 102 can provide technical improvements to cloud computing systems, computer systems, server systems, information technology systems, machine learning systems, artificial intelligence systems, digital systems, data analysis systems, and/or other systems. For example, orchestration engine component 102 can automatically monitor and/or analyze (e.g., via learning component 202) a cloud computing environment to learn one or more dependency characteristics of one or more dependencies between resource components of the cloud computing environment and can further facilitate declaring (e.g., via generating a blueprint component 108) resource components, dependencies, events, and/or actions based on the one or more dependency characteristics learned by orchestration engine component 102, thereby improving performance efficiency and/or effectiveness associated with orchestration engine component 102. Further, orchestration engine component 102 can facilitate automated execution of steady state operational actions in response to the occurrence of steady state operation events associated with a resource component of a cloud computing environment, thereby eliminating the need for an entity to repeatedly and/or dynamically declare discrete action(s) in response to respective occurrences of discrete event(s).

In some embodiments, orchestration engine component 102 can provide technical improvements to a processing unit associated with an orchestration engine process by improving processing performance of the processing unit, improving processing efficiency of the processing unit, and/or reducing an amount of time for the processing unit to perform a patch management process (e.g., patching and/or upgrading various computing resources for a cloud computing environment). For example, orchestration engine component 102 can automatically determine one or more dependencies between resource components declared in a blueprint component and can further automatically declare (e.g., via generating a blueprint component 108) events associated with steady state operation of such resource components and corresponding actions to be executed in response to the occurrence of such event(s), thereby reducing processing time and/or efficiency associated with a processor (e.g., processor 106) tasked with executing and/or facilitating execution of such steady state operational action(s).

In some embodiments, orchestration engine component 102 can also provide technical improvements to a cloud computing environment by improving processing performance of the cloud computing environment and/or improving processing efficiency of the cloud computing environment. For example, orchestration engine component 102 can share and/or exchange (e.g., via networks 308) with other orchestration engines, a blueprint component that declares events associated with steady state operation of resource components in a cloud computing environment and corresponding actions to be executed in response to the occurrence of such events. In such an example, the efficiency and/or performance of hardware (e.g., a processor) and/or software coupled to such other orchestration engines can thereby be improved by eliminating the need for such other orchestration engines to declare such steady state operational events and actions, which effectively improves the efficiency and/or performance of the cloud computing environment(s) with which such other orchestration engines are associated.

It is to be appreciated that orchestration engine component 102 can perform an orchestration engine process utilizing various combinations of electrical components, mechanical components, and circuitry that cannot be replicated in the mind of a human or performed by a human (e.g., such orchestration engine process is greater than the capability of a human mind). For example, the amount of data processed, the speed of processing such data, and/or the types of data processed by orchestration engine component 102 over a certain period of time can be greater, faster, and/or different than the amount, speed, and/or data type that can be processed by a human mind over the same period of time.

According to several embodiments, orchestration engine component 102 can also be fully operational towards performing one or more other functions (e.g., fully powered on, fully executed, etc.) while also performing the above-referenced orchestration engine process. It should also be appreciated that orchestration engine component 102 can include information that is impossible to obtain manually by an entity, such as a human user. For example, the type, amount, and/or variety of information included in one or more resource components 110, dependencies 112, events 114, and/or actions 116 can be more complex than information obtained manually by a human user.

Figure 4:
FIG. 4 illustrates an example, non-limiting declarative-based representation that facilitates orchestration engine components for a cloud computing environment in accordance with one or more embodiments described herein.

FIG. 4 illustrates an example, non-limiting declarative-based representation 400 that facilitates orchestration engine components for a cloud computing environment in accordance with one or more embodiments described herein. Repetitive description of like elements employed in respective embodiments is omitted for sake of brevity.

In some embodiments, a blueprint component 108 can comprise and/or declare declarative-based representation 400, which can be executed by orchestration engine component 102 (e.g., via processor 106) and/or various components associated with orchestration engine component 102 as described herein with reference to FIG. 1 to FIG. 3. In some embodiments, at block 402, a blueprint component 108 can declare one or more independent resource components 110 (e.g., "softlayer:virtual_machine" with the name "my_server_1"). In some embodiments, at block 404, a blueprint component 108 can declare one or more dependent resource components 110 (e.g., "Monitoring::NewRelic" with the name "my_monitoring_1") and/or one or more dependencies 112 (e.g., "depends_on=[${my_server_1}]"). In some embodiments, at block 406, a blueprint component 108 can declare one or more events 114 (e.g., "{my_server_1}.on_stop_pending") and/or one or more actions 116 (e.g., "{my_monitoring_1}.disableNotifications ( ), {my_monitoring_1}.stop( )"). In some embodiments, at block 406, in response to the occurrence of an event 114 (e.g., a stop/shutdown event), orchestration engine component 102 can facilitate execution of the corresponding action 116 declared in block 406 (e.g., stop monitoring).

FIG. 5 illustrates an example, non-limiting declarative-based representation 500 that facilitates orchestration engine components for a cloud computing environment in accordance with one or more embodiments described herein. Repetitive description of like elements employed in respective embodiments is omitted for sake of brevity.

In some embodiments, a blueprint component 108 can comprise and/or declare declarative-based representation 500, which can be executed by orchestration engine component 102 (e.g., via processor 106) and/or various components associated with orchestration engine component 102 as described herein with reference to FIG. 1 to FIG. 3. In some embodiments, at block 502, a blueprint component 108 can declare: one or more resource components 110 (e.g., independent resource component "weather" "w10598" and/or dependent resource component "openstack_heat_autoscale_stack" "hstack1"); one or more events 114 (e.g., "{weather.w10598.inclementweather}"); and/or one or more corresponding actions 116 (e.g., "self.schedule_scaleup(${weather.w10598.period})"). Continuing with block 502, in response to the occurrence of one or more events 114 (e.g., inclement weather in zip code 10598), orchestration engine component 102 can facilitate execution of the corresponding action 116 declared in block 502 (e.g., scaleup action).

In some embodiments, at block 504, a blueprint component 108 can declare: one or more resource components 110 (e.g., "load_balancer" "lb1"); one or more event 114 (e.g., "${vspherespec_vm.vsphere_windows_vm.before_stop}"); and/or one or more corresponding actions 116 (e.g., "self.drain_connections (S{vspherespec_vm.vsphere_windows_vm.ip_address})"). Continuing with block 504, in response to the occurrence of one or more events 114 declared in block 504, orchestration engine component 102 can facilitate execution of one or more of the corresponding actions 116 declared in block 504 (e.g., load-balancing actions).

In some embodiments, at block 506, a blueprint component 108 can declare: one or more resource components 110 (e.g., "veeam_backup" "backup1"); one or more events 114 (e.g., "${vspherespec_vm.vsphere_windows_vm.uptime>30 minutes}", "${self.last_backup(vspherespec_vm.vsphere_windows_vm.ip_address)>1 day}"); and/or one or more corresponding actions 116 (e.g., "self.take_backup (${vspherespec_vm.vsphere_windows_vm.ip_address})"). Continuing with block 506, in response to the occurrence of one or more events 114 declared in block 506, orchestration engine component 102 can facilitate execution of one or more of the corresponding actions 116 declared in block 506 (e.g., load-balancing actions).

Figure 6:
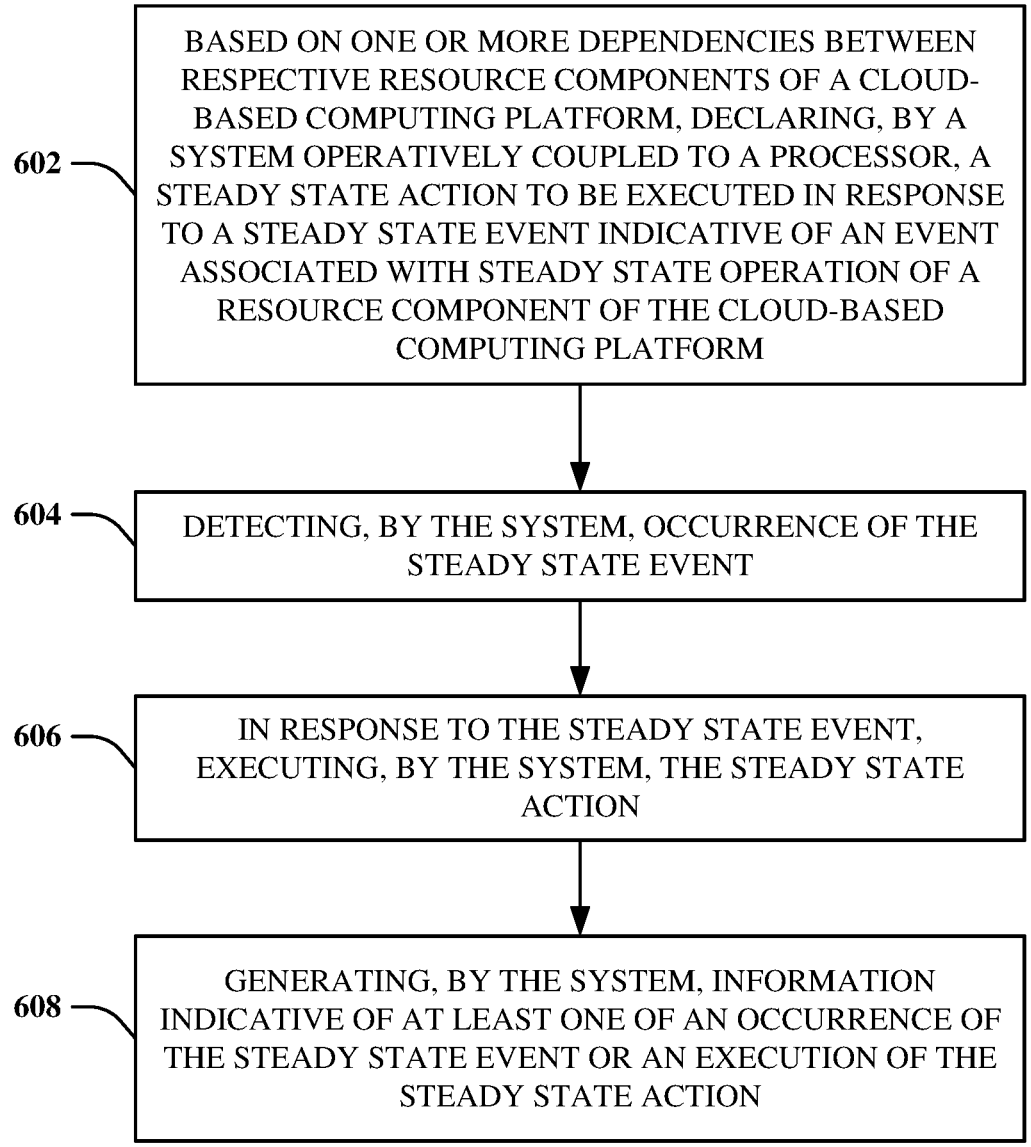
FIG. 6 illustrates a flow diagram of an example, non-limiting computer-implemented method that facilitates orchestration engine components for a cloud computing environment in accordance with one or more embodiments described herein.

FIG. 6 illustrates a flow diagram of an example, non-limiting computer-implemented method 600 that facilitates orchestration engine components for a cloud computing environment in accordance with one or more embodiments described herein. Repetitive description of like elements employed in other embodiments described herein is omitted for sake of brevity.

At 602, based on one or more dependencies (e.g., dependencies 112) between respective resource components (e.g., resource components 110) of a cloud-based computing platform (e.g., cloud-based computing platform 122), a system (e.g., orchestration engine component 102) operatively coupled to a processor (e.g., processor 106) can declare (e.g., via blueprint component 108) a steady state action (e.g., action 116) to be executed in response to a steady state event (e.g., event 114) indicative of an event associated with steady state operation of a resource component (e.g., a resource component 110) of the cloud-based computing platform. In some embodiments, the system can declare (e.g., via blueprint component 108) at least one of a steady state event or a steady state action based on one or more risks associated with the one or more dependencies (e.g., single dependency risk, multiple dependencies risk, single dimension dependency risk, multiple dimension dependency risk, workload performance risk, failure risk, security risk, financial risk, etc.). In some embodiments, the system can declare (e.g., via blueprint component 108) one or more resource properties of a resource component (e.g., domain, access compliance key/value, image, region, public network speed, processing capacity, storage capacity, compatibility, etc.) based on at least one of the one or more dependencies, the steady state event, and/or the steady state action.

At 604, the system can detect occurrence of the steady state event (e.g., via orchestration engine component 102 and/or learning component 202 monitoring one or more resource components 110 of cloud-based computing platform 122). At 606, in response to the steady state event, the system can execute the steady state action (e.g., via orchestration engine component 102 executing an action 116 declared in a blueprint component 108). At 608, the system can generate (e.g., via notification component 118) information indicative of at least one of an occurrence of the steady state event or an execution of the steady state action.

Figure 7:
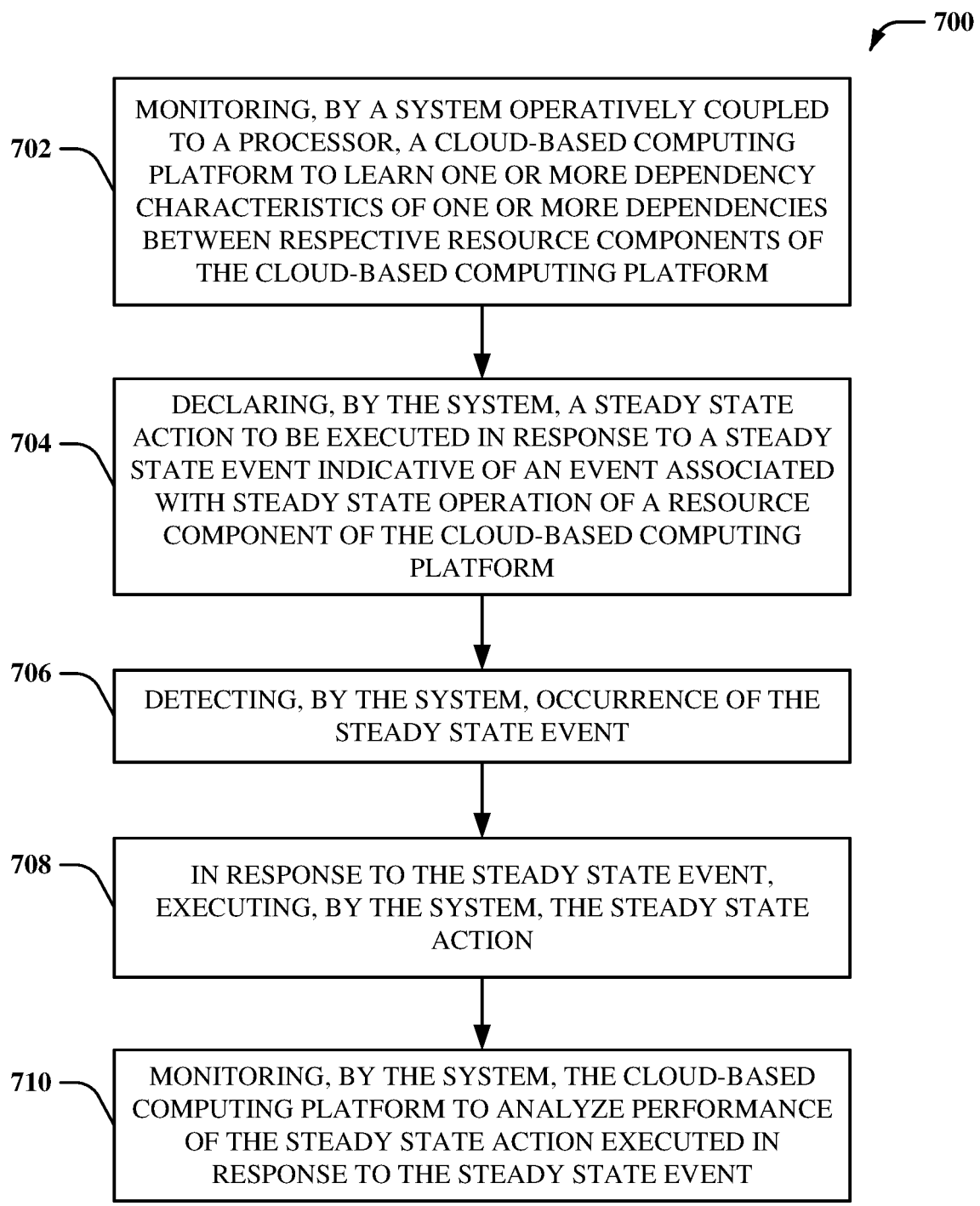
FIG. 7 illustrates a flow diagram of an example, non-limiting computer-implemented method that facilitates orchestration engine components for a cloud computing environment in accordance with one or more embodiments described herein.

FIG. 7 illustrates a flow diagram of an example, non-limiting computer-implemented method 700 that facilitates orchestration engine components for a cloud computing environment in accordance with one or more embodiments described herein. Repetitive description of like elements employed in other embodiments described herein is omitted for sake of brevity.

At 702, a system (e.g., orchestration engine component 102) operatively coupled to a processor (e.g., processor 106)

can monitor (e.g., via learning component 202) a cloud-based computing platform (e.g., cloud-based computing platform 122) to learn one or more dependency characteristics of one or more dependencies (e.g., dependencies 112) between respective resource components (e.g., resource components 110) of the cloud-based computing platform. At 704, the system can declare (e.g., via blueprint component 108) a steady state action (e.g., action 116) to be executed in response to a steady state event (e.g., event 114) indicative of an event associated with steady state operation of a resource component (e.g., a resource component 110) of the cloud-based computing platform. At 706, the system can detect occurrence of the steady state event (e.g., via orchestration engine component 102 and/or learning component 202 monitoring one or more resource components 110 of cloud-based computing platform 122). At 708, in response to the steady state event, the system can execute the steady state action (e.g., via orchestration engine component 102 executing an action 116 declared in a blueprint component 108). At 710, the system can monitor the cloud-based computing platform to analyze performance of the steady state action executed in response to the steady state event.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
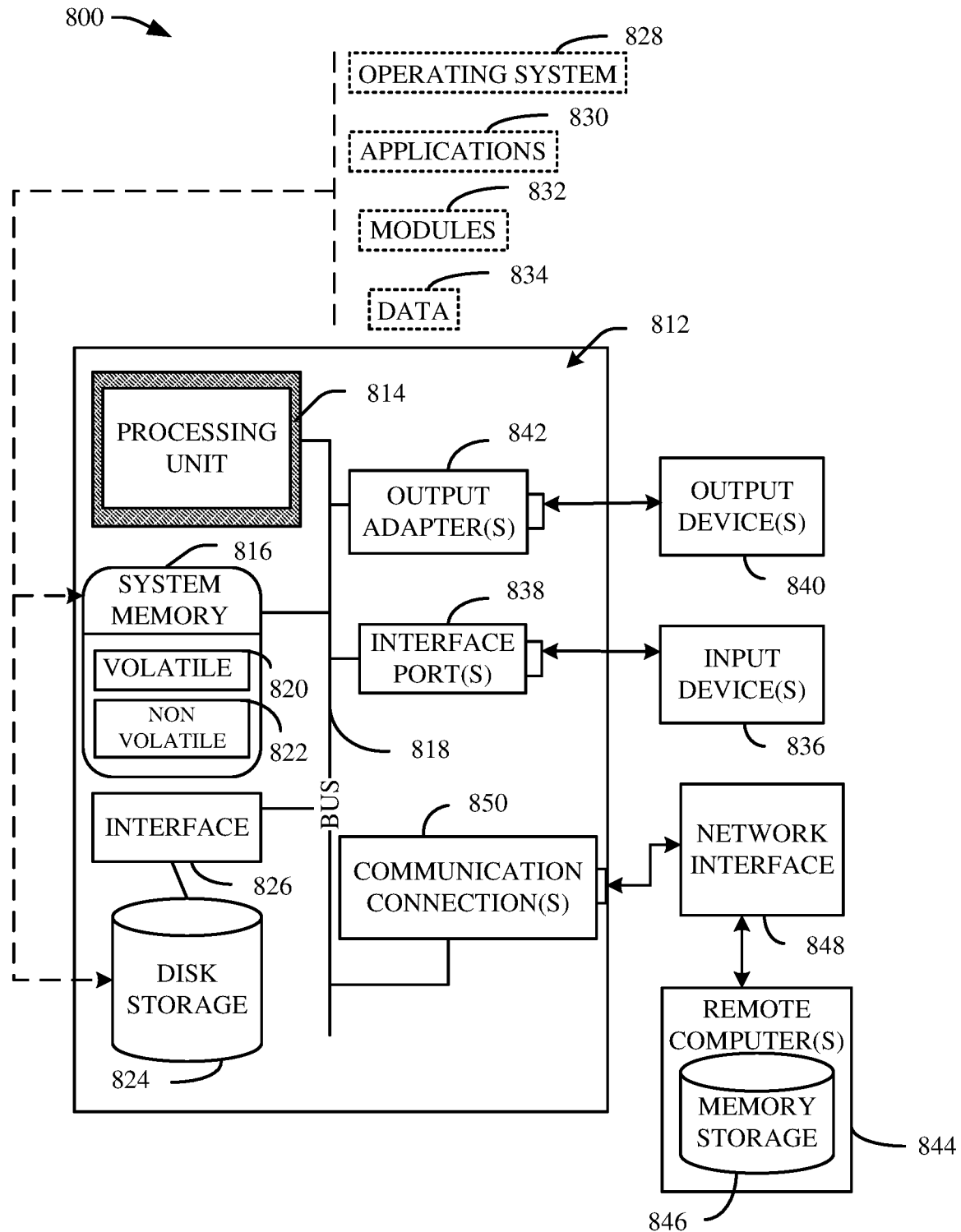
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
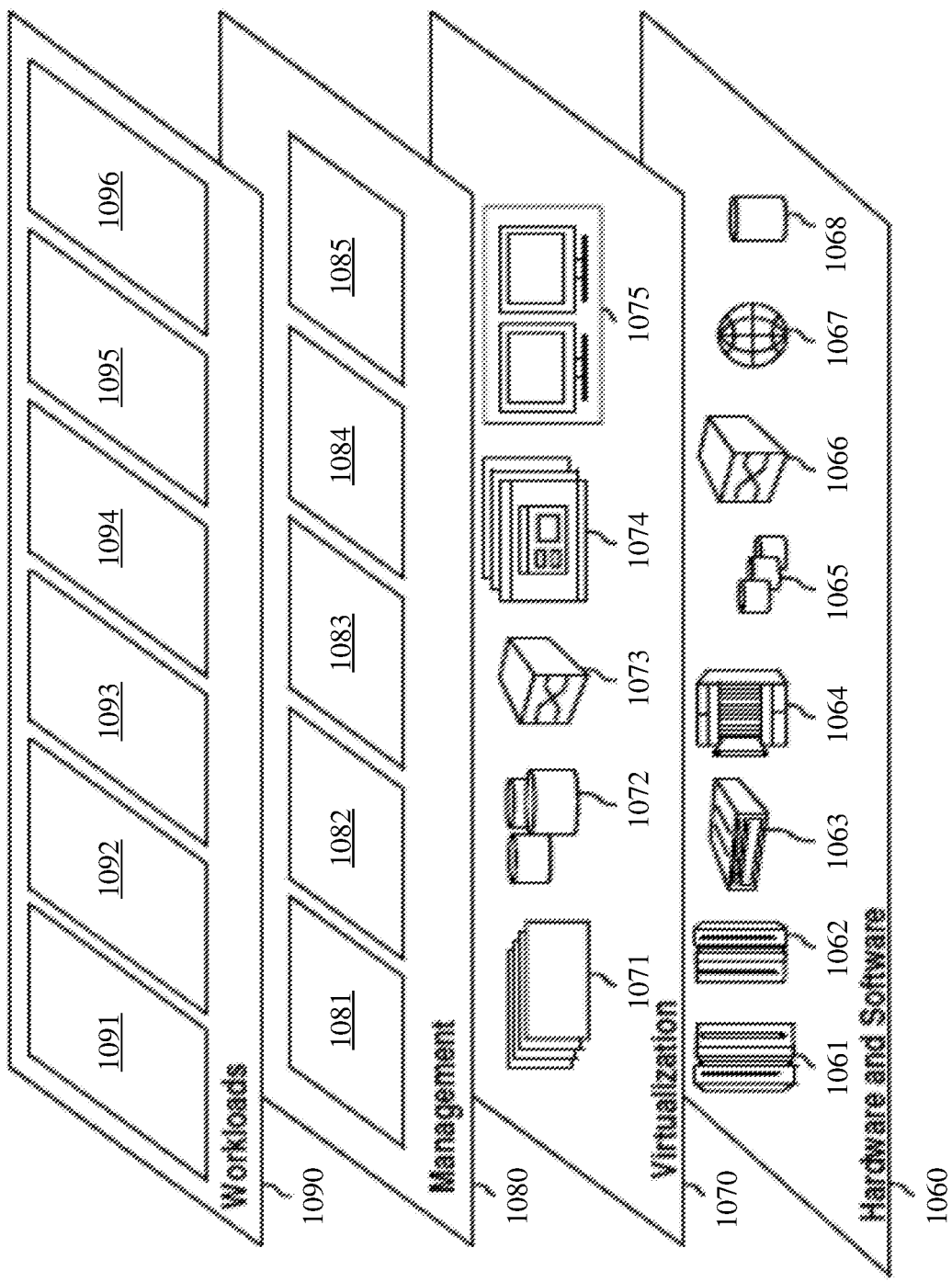
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and orchestration engine process software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a blueprint component that, based on one or more dependencies between respective resource components of a cloud-based computing platform and one or more risks associated with the one or more dependencies, declares a steady state action to be executed in response to a steady state event indicative of an event associated with steady state operation of a resource component of the cloud-based computing platform, wherein the one or more risks are selected from a group consisting of single dependency risk, multiple dependencies risk, single dimension dependency risk, multiple dimension dependency risk, workload performance risk, failure risk, security risk, and financial risk; and
   an orchestration engine component that, based on the blueprint component, executes the steady state action in response to the steady state event.

2. The system of claim 1, wherein the blueprint component declares at least one of the steady state event or the steady state action based on the one or more risks associated with the one or more dependencies.

3. The system of claim 1, wherein at least one of the blueprint component, the one or more dependencies, the respective resource components, the steady state action, the steady state event, or the resource component are indicative of a declarative-based machine-readable component.

4. The system of claim 1, wherein the blueprint component, based on one or more second dependencies, declares a second steady state action to be executed in response to a second steady state event indicative of a second event associated with steady state operation of the resource component of the cloud-based computing platform, and wherein the orchestration engine component executes the second steady state action in response to the second steady state event.

5. The system of claim 1, wherein the one or more dependencies define one or more aspects of one or more operations associated with at least one of the resource component or the respective resource components.

6. The system of claim 5, wherein the one or more aspects are selected from a group consisting of timing, schedule, and sequence, and the one or more operations are selected from a second group consisting of shutdown operation, pause operation, alert operation, and provisioning operation.

7. The system of claim 1, further comprising a notification component that generates information indicative of at least one of an occurrence of the steady state event or an execution of the steady state action.

8. The system of claim 1, wherein the blueprint component declares one or more resource properties of the resource component based on at least one of the one or more dependencies, the steady state event, or the steady state action.

9. The system of claim 1, wherein at least one of the one or more dependencies, the steady state event, or the steady state action are defined by an entity.

10. A computer-implemented method, comprising:
based on one or more dependencies between respective resource components of a cloud-based computing platform and one or more risks associated with the one or more dependencies, declaring, by a system operatively coupled to a processor, a steady state action to be executed in response to a steady state event indicative of an event associated with steady state operation of a resource component of the cloud-based computing platform, wherein the one or more risks are selected from a group consisting of single dependency risk, multiple dependencies risk, single dimension dependency risk, multiple dimension dependency risk, workload performance risk, failure risk, security risk, and financial risk; and
in response to the steady state event, executing, by the system, the steady state action.

11. The computer-implemented method of claim 10, further comprising:
generating, by the system, information indicative of at least one of an occurrence of the steady state event or an execution of the steady state action.

12. The computer-implemented method of claim 10, wherein the declaring comprises, declaring, by the system, at least one of the steady state event or the steady state action based on the one or more risks associated with the one or more dependencies.

13. The computer-implemented method of claim 10, further comprising:
declaring, by the system, one or more resource properties of the resource component based on at least one of the one or more dependencies, the steady state event, or the steady state action.

14. The computer-implemented method of claim 10, further comprising:
based on one or more second dependencies, declaring, by the system, a second steady state action to be executed in response to a second steady state event indicative of a second event associated with steady state operation of the resource component of the cloud-based computing platform; and
in response to the second steady state event, executing, by the system, the second steady state action.

15. A computer-implemented method, comprising:
monitoring, by a system operatively coupled to a processor, a cloud-based computing platform to learn one or more dependency characteristics of one or more dependencies between respective resource components of the cloud-based computing platform;
declaring, by the system, a steady state action to be executed in response to a steady state event indicative of an event associated with steady state operation of a resource component of the cloud-based computing platform and based on one or more risks associated with the one or more dependencies, wherein the one or more risks are selected from a group consisting of single dependency risk, multiple dependencies risk, single dimension dependency risk, multiple dimension dependency risk, workload performance risk, failure risk, security risk, and financial risk; and
in response to the steady state event, executing, by the system, the steady state action.

16. The computer-implemented method of claim 15, wherein the monitoring comprises monitoring, by the system, the cloud-based computing platform to analyze performance of the steady state action executed in response to the steady state event.

17. A computer program product facilitating an orchestration engine process associated with steady state operation of a resource component, the computer program product comprising a computer readable storage medium having program instructions embodied therewith, the program instructions executable by a processor to cause the processor to:
based on one or more dependencies between respective resource components of a cloud-based computing platform and based on one or more risks associated with the one or more dependencies, declare, by the processor, a steady state action to be executed in response to a steady state event indicative of an event associated with steady state operation of a resource component of the cloud-based computing platform, wherein the one or more risks are selected from a group consisting of single dependency risk, multiple dependencies risk, single dimension dependency risk, multiple dimension dependency risk, workload performance risk, failure risk, security risk, and financial risk; and
in response to the steady state event, execute, by the processor, the steady state action.

18. The computer program product of claim 17, wherein the program instructions are further executable by the processor to cause the processor to:
based on one or more second dependencies, declare, by the processor, a second steady state action to be executed in response to a second steady state event indicative of a second event associated with steady state operation of the resource component of the cloud-based computing platform; and
in response to the second steady state event, execute, by the processor, the second steady state action.

19. The computer program product of claim 17, wherein the program instructions are further executable by the processor to cause the processor to:

generate, by the processor, information indicative of at least one of an occurrence of the steady state event or an execution of the steady state action.

20. The computer program product of claim 17, wherein the program instructions are further executable by the processor to cause the processor to:

declare, by the processor, one or more resource properties of the resource component based on at least one of the one or more dependencies, the steady state event, or the steady state action.

21. A system, comprising:

a memory that stores computer executable components; and a processor that executes the computer executable components stored in the memory, wherein the computer executable components comprise:

a learning component that monitors a cloud-based computing platform to learn one or more dependency characteristics of one or more dependencies between respective resource components of the cloud-based computing platform;

a blueprint component that declares a steady state action to be executed in response to a steady state event indicative of an event associated with steady state operation of a resource component of the cloud-based computing platform, wherein the blueprint component is indicative of a declarative-based machine-readable component and wherein the blueprint component declares the steady state actions based on one or more risks associated with the one or more dependencies, wherein the one or more risks are selected from a group consisting of single dependency risk, multiple dependencies risk, single dimension dependency risk, multiple dimension dependency risk, workload performance risk, failure risk, security risk, and financial risk; and an orchestration engine component that, based on the blueprint component, executes the steady state action in response to the steady state event.

22. The system of claim 21, wherein the learning component monitors the cloud-based computing platform to analyze performance of the steady state action executed in response to the steady state event, and wherein, based on the performance of the steady state action, a second blueprint component declares a second steady state action to be executed in response to a second steady state event indicative of a second event associated with steady state operation of at least one of the resource component or a second resource component of the cloud-based computing platform.

23. The system of claim 21, wherein the learning component learns the one or more dependency characteristics by at least one of monitoring history of the one or more dependencies, monitoring previous performance of one or more workloads of the cloud-based computing platform, monitoring previous performance of one or more actions of the respective resource components, or crowdsourcing.

* * * * *